(12) United States Patent
Potter

(10) Patent No.: US 7,480,698 B2
(45) Date of Patent: Jan. 20, 2009

(54) UPDATING EVENT DATA ON A PAGE USING CODE UNDERSTOOD NATIVELY BY A BROWSER

(75) Inventor: Bruce M. Potter, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 10/740,032

(22) Filed: Dec. 18, 2003

(65) Prior Publication Data

US 2005/0138136 A1 Jun. 23, 2005

(51) Int. Cl.
*G06F 15/16* (2006.01)

(52) U.S. Cl. .................. 709/217; 709/223; 709/224; 707/E17.119

(58) Field of Classification Search .............. 709/217, 709/214, 223, 224; 707/E17.119
See application file for complete search history.

(56) References Cited

U.S. PATENT DOCUMENTS

| 7,043,525 | B2* | 5/2006 | Tuttle et al. ................ 709/203 |
| 2002/0032701 | A1 | 3/2002 | Gao et al. |
| 2002/0103897 | A1* | 8/2002 | Rezvani et al. ............. 709/224 |
| 2002/0152239 | A1* | 10/2002 | Bautista-Lloyd et al. .... 707/513 |
| 2003/0058271 | A1 | 3/2003 | Van Der Meulen |
| 2004/0098493 | A1* | 5/2004 | Rees .......................... 709/229 |

\* cited by examiner

*Primary Examiner*—Tonia L Dollinger
*Assistant Examiner*—Kyung H Shin
(74) *Attorney, Agent, or Firm*—Geraldine Monteleone, Esq.; Kevin P. Radigan, Esq.; Heslin Rothenberg Farley & Mesiti, P.C.

(57) ABSTRACT

An event data update capability for a data frame of a browser-displayed page is provided by periodically retrieving event data using a refresh frame of the page and updating the data frame with the event data. The updating of the data frame uses code understood natively by the browser. Periodic retrieval of event data by the refresh frame uses the same network connection used to download the refresh frame from a server.

19 Claims, 3 Drawing Sheets

UPDATING EVENT DATA ON A PAGE USING CODE UNDERSTOOD NATIVELY BY A BROWSER

TECHNICAL FIELD

This invention relates in general to updating event data, and more particularly, to updating event data on a page of a computing environment.

BACKGROUND OF THE INVENTION

Many applications have adopted a web browser-based interface employed by a user to interact with the application. These interfaces typically display the application data and provide buttons and links to instruct the application to perform operations. Often, it is also desirable for this web interface to dynamically update the application information that is being displayed, as soon as it changes in the application. This is sometimes called monitoring information, or event driven display. However, this is difficult to accomplish with the web interface, because it is primarily a "pull" model in which new pages are displayed only when the user requests them. There are several ways that web interface developers have attempted to overcome this restriction, but all of the approaches have drawbacks. Due to the inherent limitations of the HyperText Transfer Protocol (HTTP) model, it is not simple to overcome this problem.

One common solution to this problem is to use a META refresh tag to refresh the entire application page periodically. This approach, however, uses a large amount of network bandwidth and puts a sizable load on the server because the whole page must be generated and downloaded each time it is refreshed. Refreshing an entire page causes another problem if the page has any user input fields. If the page starts to reload when the user has typed in some input but has not yet submitted it, the input will be lost. This is because the input fields are reloaded in the browser and the fields have no knowledge of the data that was just typed.

Another common solution is to write a Java programming language applet that will display the application data in the page. This has two drawbacks. First, it usually takes a long time for the applet code to download and start up because all the Java base classes need to be downloaded as well. Second, the applet needs to open a network connection to the server in order to allow the server to "push" down data when events occur. This is undesirable because security authentication must be programmed into the newly opened connection and because the port number used by this connection may not be allowed through firewalls existing between the server and the browser.

Based on the foregoing, a need still exists for an enhanced technique to dynamically update application information that is being displayed by a browser.

SUMMARY OF THE INVENTION

The shortcomings of the prior art are overcome and additional advantages are provided through the provision of a method of updating event data on a page of a computing environment. The method includes, for instance, periodically retrieving event data using a refresh frame of a page; and updating a portion of a data frame of the page with the event data using code understood natively by a browser, wherein the browser displays the page.

Systems and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, an event data update capability is provided in which a portion of a data frame of a browser-displayed page is updated with event data. For example, in a browser with a frameset having a refresh frame (e.g., a hidden, zero-width frame) and a data frame (e.g., a visible frame including an application interface), the refresh frame uses periodic requests to a server to refresh itself to retrieve event data within code understood natively by the browser. A portion of the data frame is updated with the retrieved event data by, for instance, the code executing in the browser.

As used herein, frame refers to a window within a browser or a separate frame within a window in a browser. That is, a frame is a unit within the browser that can be downloaded from a web server.

Further, as used herein, a page (e.g., web page) is the entire display generated by a browser window and includes one or more frames. "Code understood natively by a browser" refers herein to code which can be interpreted via one or more language support facilities (e.g., interpreters) built into the browser as originally configured. Since these interpreter facilities are built into the browser, a separate installation or download of these facilities to the browser is not required by the present invention. A refresh frame refers to a frame of a browser-displayed page that is associated with one or more data frames and is used to periodically retrieve event data associated with a portion of a data frame.

Event data, as used herein, is updated information (e.g., monitoring information) associated with a portion of a data frame displayed by a browser. For example, the portion of the data frame is to be updated with the event data with which it is associated. The event data updating capability descried herein provides, for example, the appearance that updated information is "pushed" from a server to the browser without requiring a manual refresh request by a user. Further, the portion of the data frame to be updated with event data is at least one element of a data frame selectively chosen based on the event data, and is not limited to, for example, the rectangular boundaries of a frame.

Figure 1:
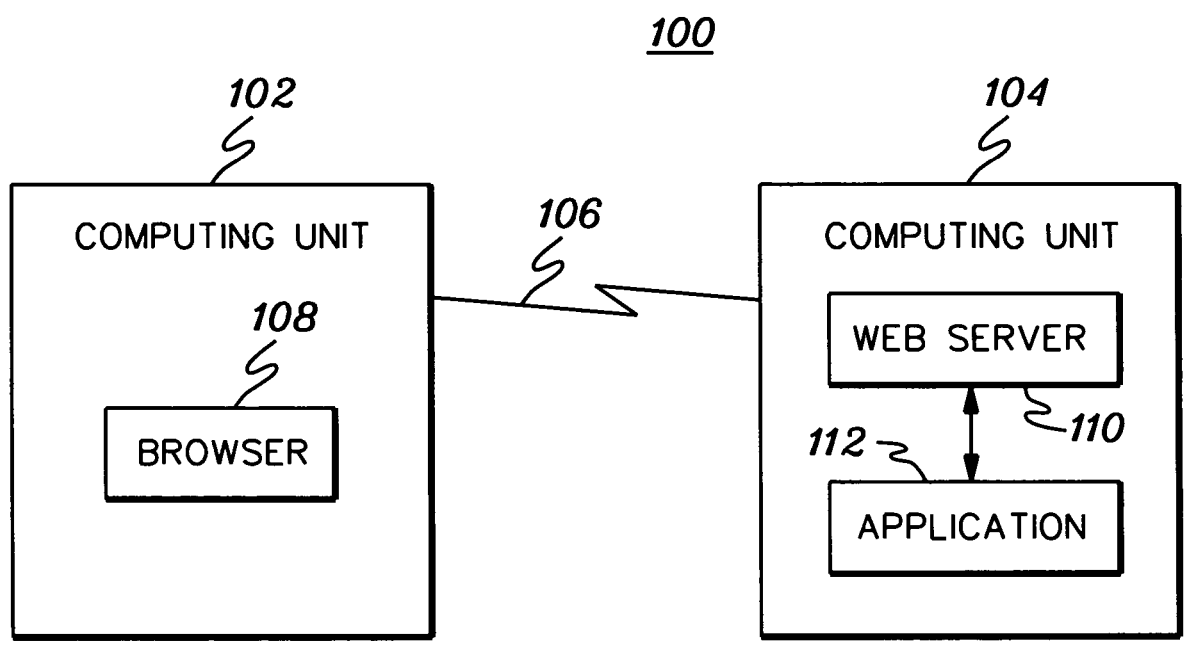
FIG. 1 depicts one embodiment of a computing environment incorporating and using one or more aspects of the present invention.

One embodiment of a computing environment incorporating and using one or more aspects of the present invention is described with reference to FIG. 1. As shown in FIG. 1, a computing environment 100 includes one or more computing units 102 coupled to computing units 104 via a connection 106. In one example, connection 106 includes a network connection. One communications protocol used by this connection is HTTP.

As examples, computing unit 102 includes a desktop or notebook computer, such as a ThinkPad computer offered by International Business Machines Corporation, Armonk, N.Y. Computing unit 104 includes, for example, an RS/6000 computer system running an AIX operating system offered by International Business Machines Corporation, Armonk, N.Y., or a UNIX workstation running a UNIX operating system, such as Solaris.

Computing unit 102 includes a browser 108 and computing unit 104 includes a web server 110 and an associated application 112. As an example, a user of computing unit 102 uses browser 108 to access and display information from application 112. In another embodiment, instead of residing in computing unit 104, application 112 could reside in another computing unit (not shown) which is coupled to computing unit 104. In a computing environment 100 having a plurality of computing units 102, and/or a plurality of computing units 104, the computing units may be homogeneous or heterogeneous to one another. Browser 108 includes, for example, Netscape Navigator, Microsoft Internet Explorer or Mozilla. Web server 110 includes, for instance, WebSphere offered by International Business Machines Corporation.

Figure 2:
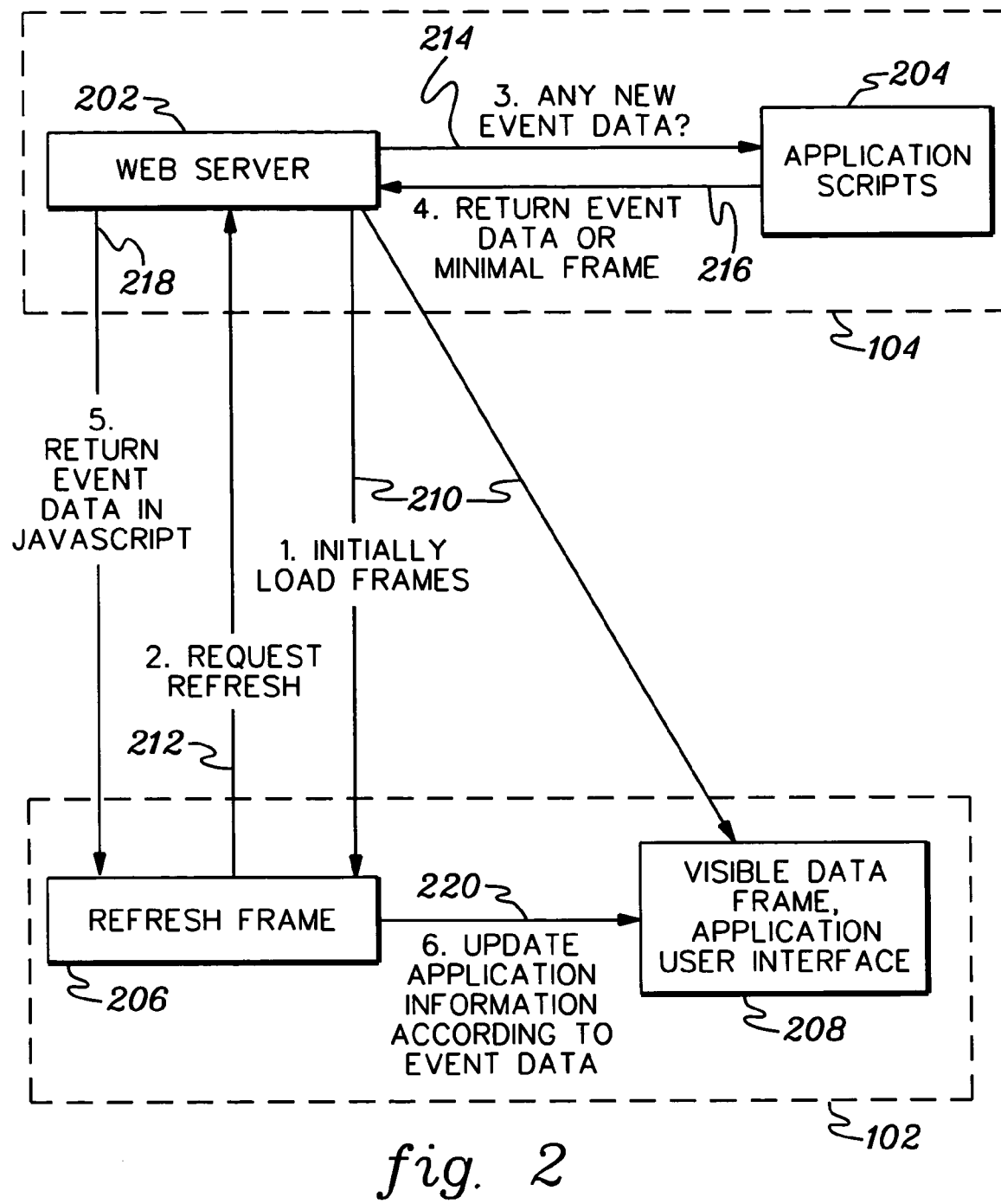
FIG. 2 depicts one embodiment of logic associated with updating event data on a single page of a computing environment, in accordance with an aspect of the present invention.

In accordance with an aspect of the present invention, one embodiment of logic to be employed in updating event data on a single page is described below with reference to FIG. 2, in which a computing unit 104 includes a web server 202 coupled to application scripts 204, and a computing unit 102 includes a refresh frame 206 coupled to a data frame 208. Refresh frame 206 and data frame 208 are also included in browser 108 (FIG. 1; not shown in FIG. 2). As an example, application scripts 204 include Common Gateway Interface (CGI) application scripts.

When a user utilizes browser 108 to visit a page having information generated by application scripts 204, web server 202 initially loads 210 refresh frame 206 and data frame 208. Data frame 208 is, for example, visible to the user and includes an application user interface. Refresh frame 206 is, for instance, normally hidden, using a frameset setting such as:

```
<FRAMESET cols = "0,* " frameborder= "NO" border = "0">
    <FRAME src = "refresh.cgi" name = "refresh" noresize scrolling =
    "NO">
    <FRAME src = "data.cgi" name = "data">
</FRAMESET>
```

Refresh frame 206 can be made visible at certain times (e.g., during a debugging process) by changing the "0" in the above-described frameset setting to a variable that is set to non-zero. Refresh frame 206 and data frame 208 are named in the above-described frameset setting to provide the frames with the capability to refer to each other. As an alternative to the frameset setting shown above, window objects can be used for defining data frame 208 and refresh frame 206.

Data frame 208 displays information from application 112 through, for instance, a user interface. This application information may need to be updated. Refresh frame 206 periodically retrieves event data that indicates, for example, application information to be updated on a data frame of a page.

Refresh frame 206 is set to automatically re-load (i.e., refresh) itself periodically, by including, for example, the following line in the <HEAD> section of its Hypertext Markup Language (HTML) code:

```
<META HTTP-EQUIV="REFRESH"
    CONTENT="$refreshInterval">
```

This periodic refresh is performed by periodically sending a refresh request 212 from refresh frame 206 to web server 202. This refresh is automatic because it requires no user intervention, such as a user activating a refresh button on a browser-displayed page.

An alternate way to specify the refresh of refresh frame 206 is to use a JavaScript function (e.g., window.setTimeout( )) to set the window.location property.

The time interval between the periodic refresh requests 212 is a variable that can be set by a user. This interval can be, for example, fairly short (e.g., 15 seconds) because very little data is transferred in each interval.

Refresh request 212 causes web server 202 to contact application scripts 204 to determine if new event data exists (e.g., event data that indicates application information in need of updating since the most recent refresh of the refresh frame). If new event data exists, application scripts 204 generate code (e.g., JavaScript) understood natively by browser 108 to update data frame 208. The code includes the new event data and is returned 216 to web server 202. Web server 202, in turn, sends 218 the code, including the new event data to refresh frame 206. Browser 108 executes the code to update 220 application information according to the new event data (e.g., to update event data displayed in data frame 208). The detection and retrieval of new event data are performed automatically and irrespective of a manual request by a user for event data retrieval or for data frame updating.

The check for new event data 214 and the generation of the code (e.g., JavaScript code) is performed on computing unit 104 using any server-side language, for example, CGI scripts, Java Server Pages (JSP), Active Server Page (ASP), or PHP Hypertext Preprocessor. This check for new event data and the associated update of the data frame is performed without an application (e.g., server-side application) maintaining state related to one or more browsers or clients. As one example, the following Perl CGI code is generated at application scripts 204 to return new event data to web server 202, and generates JavaScript code which is understood natively by, and is to be executed at, browser 108.

```
my $eventStates = getEvents( );
if (scalar(keys %$eventStates))
{
print<< 'END_OF_HTML';
<SCRIPT language = "JavaScript">
<!--
var good = " . . . /images/green-ball-m.gif";
var bad = " . . . /images/red-ball-m.gif";
if (top && top.data && top.data.document && top.data.loadingDone)
{
var doc = top.data.document;
END_OF_HTML
foreach my $k (keys %$eventStates)
    {
    my $i = $$eventStates{$k} ? 'bad' : 'good';
    print "if (doc.$k) {if (doc.$k.src! = $i) {doc.$k.src=$i}}\n";
    }
print << 'END_OF_HTML2';
```

```
}
else { document.write('<p>Data frame not fully loaded yet.
Waiting . . . </p>');}
//-->
</SCRIPT>
END_OF_HTML2
} # if (scalar(keys %$eventStates))
print "</BODY></HTML>\n";
```

In the preceding example, new event data, if there is any, is placed in the eventState hashtable. The foreach loop then generates JavaScript to modify red and green images displayed in data frame 208 accordingly. An example of this generated JavaScript code includes the following:

```
<SCRIPT language="JavaScript">
<!--
var good = " . . . /images/green-ball-m.gif";
var bad = " . . . /images/red-ball-m.gif";
if (top && top.data && top.data.document && top.data.loadingDone)
{
  var doc = top.data.document;
  if (doc.key1) {if (doc.key1.src!=bad) {doc.key1.src=bad}}
  if (doc.key2) {if (doc.key2.src!=good) {doc.key2.src=good}}
  . . .
}
else { document.write('<p>Data frame not fully loaded yet.
Waiting . . . </p>'); }
//-->
</SCRIPT>
```

Returning to web server's 202 check to determine whether new event data exists 214, if there is no new event data, application scripts 204 return a minimal frame that includes only a few bytes of HTML code to be sent to refresh frame 206. This small amount of code is required to be in browser 108 to automatically request the next periodic refresh of refresh frame 206. Advantageously, the minimal frame facilitates minimizing network utilization and load on computing unit 104, which includes web server 202. One example of the minimal frame is the following HTML code, in which "refinterval" would be replaced with the current refresh interval setting:

```
<HTML><HEAD>
<META HTTP-EQUIV="REFRESH" CONTENT="refinterval">
</HEAD><BODY></BODY></HTML>
```

While data frame 208 is being downloaded into browser 108, the refresh frame can be prevented from modifying data frame 208. This prevention of data frame modification is done, for example, by a check for top.data.loadingDone, as shown in the preceding Perl example. This property is set by data frame 208 in, for example, a JavaScript function that is assigned to the window.onload property.

If data frame 208 includes links to other pages and a user navigates to one of those pages, the entire frameset (e.g., refresh frame 206 and data frame 208) needs to be replaced so refresh frame 206 does not continue to periodically refresh. This frameset replacement can be accomplished by, for example, associating the following JavaScript code with window.onload:

```
for(var i = 0; i<document.links.length; i++)
{
  var I = document.links[i];
  if(I.target = = = null || I.target = = = ' ' || I.target = = = '_self')
  {I.target = '_top';}
}
```

The preceding JavaScript code example is executed in browser 108 and modifies the target property to be the entire browser window for all links that do not already have a target specifically set.

Figure 3:
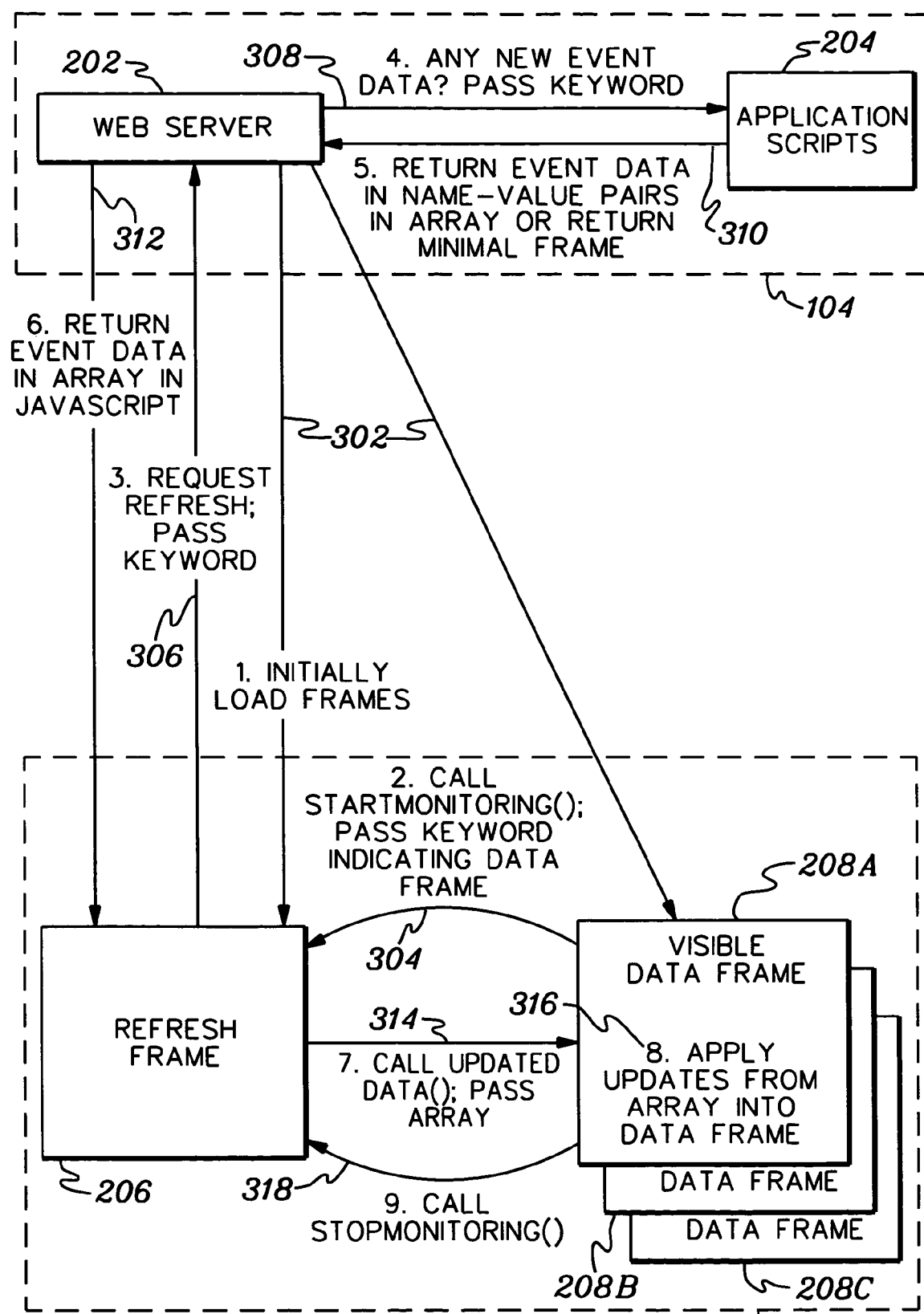
FIG. 3 depicts one embodiment of logic associated with updating event data on multiple pages of a computing environment, in accordance with an aspect of the present invention.

In another embodiment, a single refresh frame is used to update a plurality of data frames. Each of the plurality of data frames is included in one of a plurality of pages. As one example of this multiple page case, described with reference to FIG. 3, a computing unit 102 includes data frames 208A, 208B, 208C coupled to a refresh frame 206, and a computing unit 104 includes a web server 202 and associated application scripts 204. Web server 202 initially loads 302 refresh frame 206 and data frames 208A-208C. Data frame 208A is, for instance, visible to a user of computing unit 102 and includes an application user interface. Refresh frame 206, as noted above, is normally hidden from the user's view.

Following the initial frame loading, data frame 208A directs refresh frame 206 to start monitoring for event data by calling a function 304 (e.g., startMonitoring ( ), typically called from window.onload). This start monitoring function call 304 is necessary because the user can navigate to multiple pages within the frameset including refresh frame 206 and data frames 208A-208C, and some of the pages may be static (i.e., pages that do not require updating with event data). The start monitoring call 304 also passes a parameter, such as a keyword, to refresh frame 206 that identifies the data frame for which event data is to be retrieved.

Refresh frame 206 then periodically sends a request 306 to refresh itself. This request includes the parameter identifying the data frame. The interval between refresh requests 306 is described above relative to refresh request 212 (FIG. 2). Responsive to refresh request 306, web server 202 queries 308 application scripts 204 to determine if new event data exists and passes the parameter with query 308.

Application scripts 204 then use the parameter to determine if new event data exists for the data frame identified by the parameter. If no new event data exists, a minimal frame is sent 310 from application scripts 204 to web server 202, and then to a browser in computing unit 102, as described above relative to FIG. 2.

If new event data exists, generic code is generated by application scripts 204 to be sent 310 to web server 202. For example, application scripts 204 generate the following JavaScript code for creating an array of objects that contain pairs of event names and event values:

*var a*=new Array({name:*n*1, value:*v*1}, {name:*n*2, value:*v*2}, . . . );

In one example, this JavaScript code is inserted into the Perl script described above, and n1, v1, n2, v2, etc. are replaced with actual values when the JavaScript code is generated by application scripts 204.

The array containing the event data is then sent 312 from web server 202 to refresh frame 206. Refresh frame 206, in turn, passes the array to data frame 208A in a function call 314 (e.g., updatedData(a)).

Within data frame 208A, one or more event data updates from the array are applied 316 in the data frame. At a later time, data frame 208A calls a function 318 to stop monitoring for event data (e.g., stopMonitoring ( ), typically called from window.onunload). The following function is one example of JavaScript code that is executed in the data frame to apply event data updates from the array of event name-value pairs:

```
function updateData(a)
{
  for(var i = 0; i < a.length; i++)
  {
    var good = " . . . /images/green-ball-m.gif";
    var bad = " . . . /images/red-ball-m.gif";
    var image = a[i].value ? bad : good;
    if (document.images[a[i].key].src!=image)
    {document.images[a[i].key].src=image}
  }
}
```

Advantageously, the event data update technique described above allows application information displayed in a portion of a page to be dynamically and automatically updated while minimizing network utilization and server load, without requiring an entire page or an entire visible frame to be redrawn by the browser, and without requiring user intervention. Further, the present invention provides this update capability without requiring the installation of complex language support software which is not already built into (i.e., native to) the browser. Still further, event data is retrieved from the server using the same network connection employed to retrieve the refresh frame, thereby eliminating the need for an extra network connection to retrieve event data. In contrast to conventional techniques whereby an entire page is redrawn periodically, the technique described herein avoids erasing or otherwise affecting existing input in user input fields of a page while event data is being applied on the page. Moreover, the updating technique described herein provides a visually appealing presentation of the data frame by not requiring the whole page to temporarily disappear and to be redrawn.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of updating event data on a page of a computing environment, said method comprising:
    automatically, periodically retrieving by a browser server event data using a refresh frame of a page displayed by the browser, the refresh frame being part of a frameset of the browser, the frameset including the refresh frame and a data frame, the refresh frame being a hidden, zero-width frame and the data frame being a visible frame including an application interface, and the event data being updated information associated with only a portion of the data frame;
    updating by the browser only the portion of the data frame of the page with event data automatically retrieved using the refresh frame, the updating including employing code understood natively by the browser, wherein the portion of the data frame updated is the portion of the data frame to which the event data is associated, and comprises at least one element of the data frame selectively chosen based on the event data, the portion of the data frame updated being less than the entire data frame; and
    wherein the frameset comprises the refresh frame and a plurality of data frames, and wherein one data frame of the plurality of data frames is a visible frame at a time as a user navigates across the plurality of data frames, the plurality of data frames including at least one static data frame and at least one other data frame, and wherein the automatically, periodically retrieving by the browser server event data using the refresh frame comprises automatically, periodically retrieving server event data for the other data frame of the at least one other data frame of the plurality of data frames only when the other data frame is the visible frame.

2. The method of claim 1, wherein said code understood natively by the browser comprises code supported by an interpreter built into the browser as originally configured.

3. The method of claim 1, wherein the automatically, periodically retrieving event data is initiated by a call originating with the other data frame when the other data frame becomes the visible frame, the call being automatically invoked when the user navigates to the other data frame, the call passing to the refresh frame a parameter identifying the other data frame for which event data is to be retrieved, wherein initiation of the automatically, periodically retrieving is handled entirely by the browser without assistance of an application external to the browser.

4. The method of claim 3, further comprising automatically terminating the automatically, periodically retrieving by a call originating with the other data frame, the call being automatically invoked when the user navigates away from the other data frame, and wherein termination of the automatically, periodically retrieving is handled entirely by the browser without assistance of an application external to the browser.

5. The method of claim 3, further comprising blocking the automatically, periodically retrieving when a static data frame of the at least one static data frame is the visible frame.

6. The method of claim 1, wherein said automatically, periodically retrieving further comprises periodically requesting, by the refresh frame, the server to refresh the refresh frame.

7. The method of claim 3, wherein said periodically retrieving further comprises:
    detecting the event data associated with the one other data frame when the one other data frame is the visible frame;

sending, responsive to the detecting, the event data to the browser via the server; and wherein the detecting and the sending are performed automatically by an application coupled to the server irrespective of a manual request by a user for at least one of the periodically retrieving and the updating.

8. The method of claim 1, wherein said periodically retrieving the event data further comprises receiving the event data at the browser within the code understood natively by the browser to be used to update the portion of the one other data frame, wherein the code is generated by the application.

9. The method of claim 1, wherein said updating the portion of said data frame further comprises executing the code by the browser to update the portion of the one other data frame.

10. A system for updating event data on a page of a computing environment, said system comprising:

a processing unit and memory;

means for automatically, periodically retrieving by a browser server event data using a refresh frame of a page displayed by the browser, the refresh frame being part of a frameset of the browser, the frameset including the refresh frame and a data frame, the refresh frame being a hidden, zero-width frame and the data frame being a visible frame including an appropriate interface, and the event data being updated information associated with only a portion of the data frame;

means for updating by the browser only the portion of the data frame of the page with event data automatically retrieved using the refresh frame, the updating including employing code understood natively by the browser, wherein the portion of the data frame updated is the portion of the data frame to which the event data is associated, and comprises at least one element of the data frame selectively chosen based on the event data, the portion of the data frame updated being less than the entire data frame; and wherein the frameset comprises the refresh frame and a plurality of data frames, and wherein one data frame of the plurality of data frames is a visible frame at a time as a user navigates across the plurality of data frames, the plurality of data frames including at least one static data frame and at least one other data frame, and wherein the means for automatically, periodically retrieving by the browser server event data using the refresh frame comprises means for automatically, periodically retrieving server event data for one other data frame of the at least one other data frame of the plurality of data frames only when the one other data frame is the visible frame.

11. The system of claim 10, wherein said code understood natively by the browser comprises code supported by an interpreter built into the browser as originally configured.

12. The system of claim 10, wherein the means for automatically, periodically retrieving event data is initiated by a call originating with one other data frame when the one other data frame becomes the visible frame, the call being automatically invoked when the user navigates to the one other data frame, the call passing to the refresh frame a parameter identifying that one other data frame for which event data is to be retrieved, wherein initiation of the means for automatically, periodically retrieving is handled entirely by the browser without assistance of an application external to the browser.

13. The system of claim 12, further comprising automatically terminating the means for automatically, periodically retrieving by a call originating with the one other data frame, the call being automatically invoked when the user navigates away from that one other data frame, and wherein termination of the means for automatically, periodically retrieving is handled entirely by the browser without assistance of any application external to the browser.

14. The system of claim 12, wherein said means for periodically retrieving further comprises:

means for detecting the event data associated with the one other data frame when the one other data frame is the visible frame;

means for sending, responsive to the detecting, the event data to the browser via the server; and wherein the detecting and the sending are performed automatically by an application coupled to the server irrespective of a manual request by a user for at least one of the periodically retrieving and the updating.

15. A computer program product comprising at least one program storage device having stored thereon computer executable instructions that, when executed by a processor, perform a method of updating event data on a page of a computing environment, said method comprising:

automatically, periodically retrieving by a browser server event data using a refresh frame of a page displayed by the browser, the refresh frame being part of a frameset of the browser the frameset including the refresh frame and a data frame, the refresh frame being hidden, zero-width frame and the data frame being a visible frame including an application interface, and the event data being updated information associated with only a portion of the data frame;

updating by the browser only the portion of the data frame of the page with the event data automatically retrieved using the refresh frame, the updating including employing code understood natively by the browser, wherein the portion of the data frame updated is the portion of the data frame to which the event data is associated, and comprises at least one element of the data frame selectively chosen based on the event data, the portion of the data frame updated being less than the entire data frame; and wherein the frameset comprises the refresh frame and a plurality of data frames, and wherein one data frame of the plurality of data frames is a visible frame at a time as a user navigates across the plurality of data frames, the plurality of data frames including at least one static data frame and at least one other data frame, and wherein the automatically, periodically retrieving by the browser server event data using the refresh frame comprises automatically, periodically retrieving server event data for one other data frame of the at least one other data frame of the plurality of data frames only when the one other data frame is the visible frame.

16. The computer program product of claim 15, wherein said code understood natively by the browser comprises code supported by an interpreter built into the browser as originally configured.

17. The computer program product of claim 15, wherein the automatically, periodically retrieving event data is initiated by a call originating with one other data frame when the one other data frame becomes the visible frame, the call being automatically invoked when the user navigates to the one other data frame, the call passing to the refresh frame a parameter identifying that one other data frame for which event data is to be retrieved, wherein initiation of the automatically, periodically retrieving is handled entirely by the browser without assistance of an application external to the browser.

18. The computer program product of claim 17, further comprising automatically terminating the automatically, periodically retrieving by a call originating with the one other data frame, the call being automatically invoked when the user navigates away from that other data frame, and wherein termination of the automatically, periodically retrieving is handled entirely by the browser without assistance of an application external to the browser.

19. The computer program product of claim 17, wherein said periodically retrieving further comprises:

detecting the event data associated with the one other data frame when the one other data frame is the visible frame;

sending responsive to the detecting, the event data to the browser via the server; and wherein the detecting and the sending are performed automatically by an application coupled to the server irrespective of a manual request by a user for at least one of the periodically retrieving and the updating.

\* \* \* \* \*